INVENTORS

April 26, 1960   B. H. JULIER ET AL   2,934,380
EMERGENCY ACTUATING MEANS FOR VEHICULAR BRAKES
Filed June 6, 1955

INVENTORS
Bertram H. Julier
and Jerome Belsky
BY
Rockwell Bachtolou
ATTORNEYS

April 26, 1960   B. H. JULIER ET AL   2,934,380
EMERGENCY ACTUATING MEANS FOR VEHICULAR BRAKES
Filed June 6, 1955   7 Sheets-Sheet 5

United States Patent Office 2,934,380
Patented Apr. 26, 1960

2,934,380
EMERGENCY ACTUATING MEANS FOR VEHICULAR BRAKES

Bertram Harvey Julier, Hamden, Conn., and Jerome Belsky, Falls Church, Va., assignors, by mesne assignments, to The Gabriel Company, a corporation of Ohio Application June 6, 1955, Serial No. 513,324

7 Claims. (Cl. 303—7)

This invention relates to a mechanism for actuating vehicular brakes and more particularly to an emergency mechanism for this purpose which may be employed to actuate or set the brakes in the event of failure of the normal mechanism provided for this purpose.

It sometimes occurs that the brakes upon vehicles such as trucks, automobiles, or vehicles of other types, fail for various reasons, and in such case the operator has inadequate means for bringing the vehicle to a stop. This may be particularly true of trucks, for example, which employ air brakes, but is also true of other vehicles which employ fluid brakes of other types.

The failure of the brake system may occur from any one of a number of causes. Usually such brakes are set by the movement of a piston or plunger which is operated by fluid pressure, either air or hydraulic. If the air or hydraulic pressure is lost in any manner, the piston cannot be actuated, and this is, of course, also true if there is a leak or broken connection between the source of power and the cylinder in which the actuating piston moves.

According to the present invention an emergency actuating means is provided which may be readily resorted to by the operator upon failure of the usual brake-actuating mechanism. As illustrated, this may take the form of a member connected to the brake-operating mechanism which member is adapted to be operated by energy produced by the ignition of a cartridge which can be readily released by the operator when he discovers that the brakes have failed. For example, an auxiliary piston and cylinder unit may be placed in the line leading from the main actuating cylinder to the arm which actuates the brake cam and pressure supplied to the cylinder of this unit by a propellant type cartridge which may be electrically or mechanically initiated.

Alternatively, this auxiliary unit may be placed in parallel relationship with the usual brake-actuating means so as to actuate the brake cam when a cartridge or similar device is ignited by the operator of the vehicle.

One object of the present invention is to provide an emergency operating mechanism for vehicle brakes which may be readily and conveniently energized by the operator of the vehicle upon failure of the usual brake.

Still another object of the invention is to provide an emergency brake-actuating mechanism for vehicles which may be electrically energized at the will of the operator of the vehicle to set the brakes upon failure of the usual brake mechanism.

A still further object of the invention is the provision of an auxiliary actuating means connected to the usual brake-operating mechanism, this auxiliary means comprising a piston and a cylinder and means for introducing a pressure fluid into this cylinder at the will of the operator, the pressure fluid being derived from a source in addition to that of the normal brake-operating means.

Still another object of the invention is the provision of an emergency-actuating mechanism for vehicle brakes as described above wherein the auxiliary actuating means is itself actuated by an auxiliary source of fluid pressure such as a cartridge, squib or like device.

Still another object of the invention is the provision of an emergency operating mechanism for brakes of vehicles as described above wherein the auxiliary operating mechanism is in turn actuated by gas pressure which may be supplied from the ignition of a cartridge or squib which may provide the gas pressure to operate the brakes, such ignition being effected automatically.

To these and other ends the invention consists in the novel features and combinations of parts to be hereinafter described and claimed.

To illustrate a preferred embodiment of the invention there is shown in the drawings a brake-actuating cam shaft 10 of the usual form to which is secured the actuating arm 11. In the usual brake-actuating mechanism of a vehicle, the arm 11 is secured to a piston rod 12 which extends into a chamber 13 through a generously sized opening 14. This piston rod carries a plate or head 15 which rests against a diaphragm 16 which spans the chamber.

Figure 1:
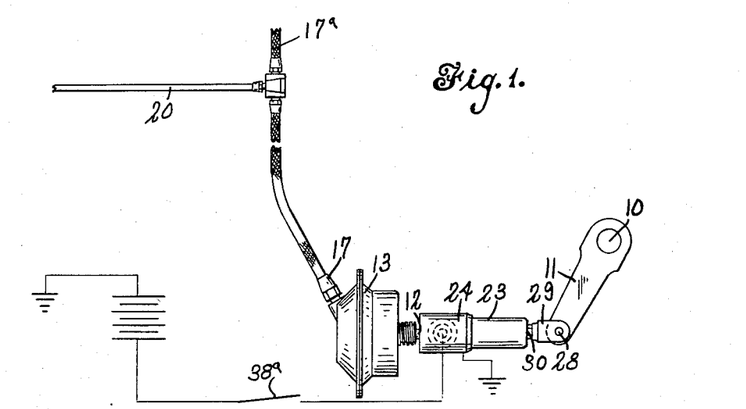
Fig. 1 is a diagrammatic view of a brake-operating mechanism having our invention applied thereto.

A fluid under pressure such as air, for example, may be introduced into the chamber rearwardly of the piston by the connection 17. A spring 18 normally holds the piston in the position shown in Fig. 2 in which position the brake is released. When, however, fluid pressure is introduced through the connection 17, the diaphragm moves the piston 12 to the right and moves the arm 11 from the full to the dotted-line position shown in this figure to set the brakes. As shown in Fig. 1, the connection 17 may be supplied from a line 20 leading to a suitable source of air pressure and a second line 17ᵃ may lead to the brake-actuating mechanism of the other of a pair of wheels. It is understood, of course, that brakes may be employed with all of the wheels of the vehicle if desired.

The mechanism described above is of conventional form with the exception that in the presently used conventional structure the piston 12 is connected directly to the arm 11. Also in the usual structure heretofore used the chamber or cylinder 13 may be supported in any desired manner such as by a bracket 21 from the vehicle axle shown conventionally at 22.

In accordance with the present embodiment of the invention an auxiliary actuating unit is placed between the piston 12 and the arm 11. This auxiliary unit comprises a cylinder 23 having a head 24 rigidly secured to the rod 12. Within this cylinder is disposed a piston rod 25 carrying a piston 26 which may be provided with the usual packing ring 27 so that it will be substantially air tight. The piston rod 25 extends through the end of the cylinder and is pivotally connected to the arm 11, as shown at 28, by means of a clevis 29. It may be noted that in the position shown in Fig. 2 the end of the cylinder 23 makes contact with a nut or shoulder 30 on the rod 25.

Figure 3:
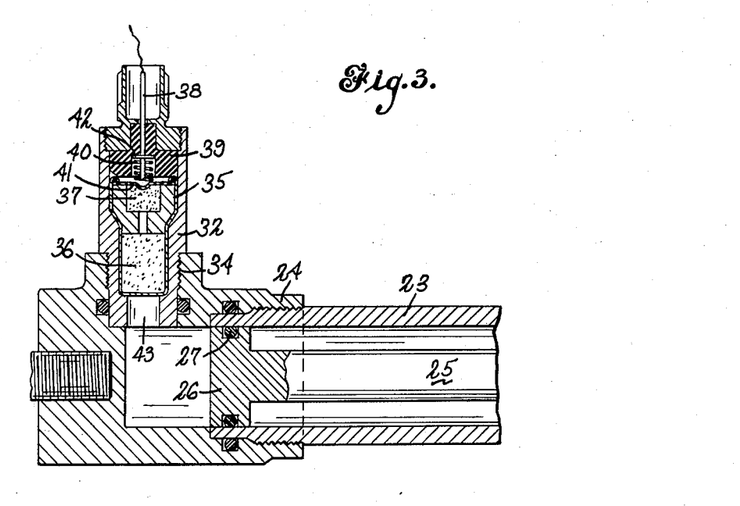
Fig. 3 is a sectional view of the auxiliary piston and cylinder unit taken on line 3—3 of Fig. 2.

Referring to Fig. 3, it will be noted that a gas generating cartridge mechanism is supported by the head 24 of the cylinder 23. This mechanism comprises a casing 32 threadedly secured at 34 within a passage in the head 24 of the cylinder so that the interior of the casing communicates with the interior of the cylinder rearwardly of the piston 26.

Supported within the casing 32 is a cartridge comprising a relatively thin cartridge case 35 within which is contained propellant type fuel 36 which may be some form of propellant powder and priming material 37 which may be ignited electrically or mechanically.

To this end a lead-in electric connection 38 enters the case 32 through electric insulation 39. A spring 40 bears at its inner end against a cover 41 of the primer and at its outer end upon a washer or collar 42 upon the lead 38. This spring, therefore, completes the connection between the lead 38 and the priming material (which is electrically conductive) so that when an electric current is applied to the lead 38, heat will be generated in the priming material to ignite it. It will be understood that the current from the lead 38 is completed or grounded through the case 32 and cylinder head 24 to the vehicle frame.

Figure 2:
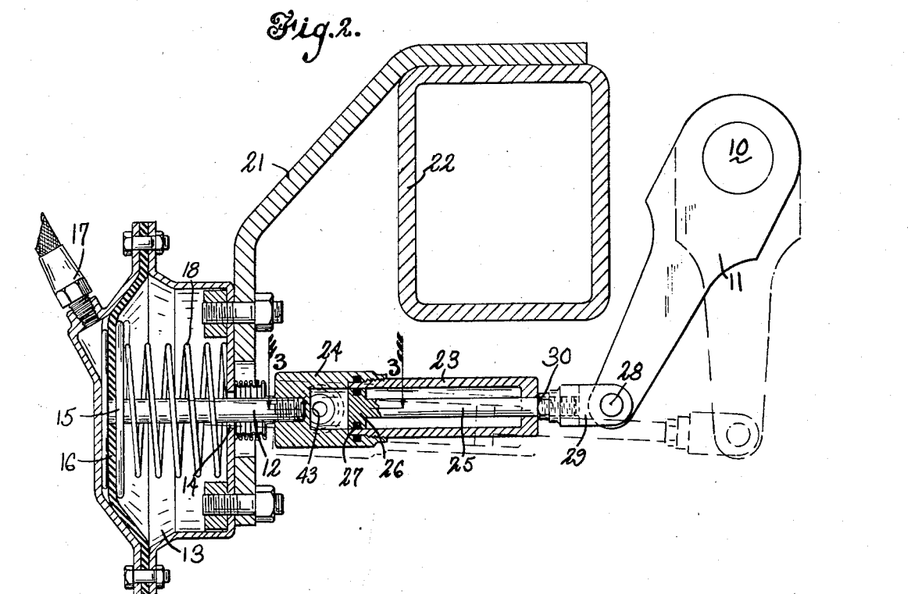
Fig. 2 is an enlarged sectional view of the emergency brake-operating means.

When the gas generator is actuated manually, an electric conductor leads from the member 38 to a switch 38ª in the cab or at some point adjacent the operator of the vehicle so that he may operate it. Upon closing this switch an electric circuit is completed through the lead 38 and cartridge to burn the fuel charge 36. The pressure gases resulting from the combustion enter the forward end of the cylinder head 24 through the passage 43 and drive the piston 26 rearwardly or to the right, as shown in Fig. 2, thus moving the arm 11 from the full to the dotted-line position to set the brakes. It will be understood that the opening 14 through which the piston rod 12 passes is sufficiently large to allow some play so that the pivot point 28 may move over an arcuate path, the diaphragm 16 being sufficiently flexible to allow such movement.

In the normal operation of the brakes when pressure is admitted to the chamber 13 through the lead 17, the cylinder 23 is moved toward the right, as shown in Fig. 2, due to its connection with the rod 12, and as the cylinder abuts against the collar or nut 30, it also moves the piston rod 25 in the same direction and actuates the arm 11. Thus the brakes will operate in their normal fashion so long as the braking system is operative, but upon a failure of this system, the operator, by closing the switch adjacent his seat, ignites the charge 36 and effects the operation of the brake by the piston 25 as described.

Figure 4:
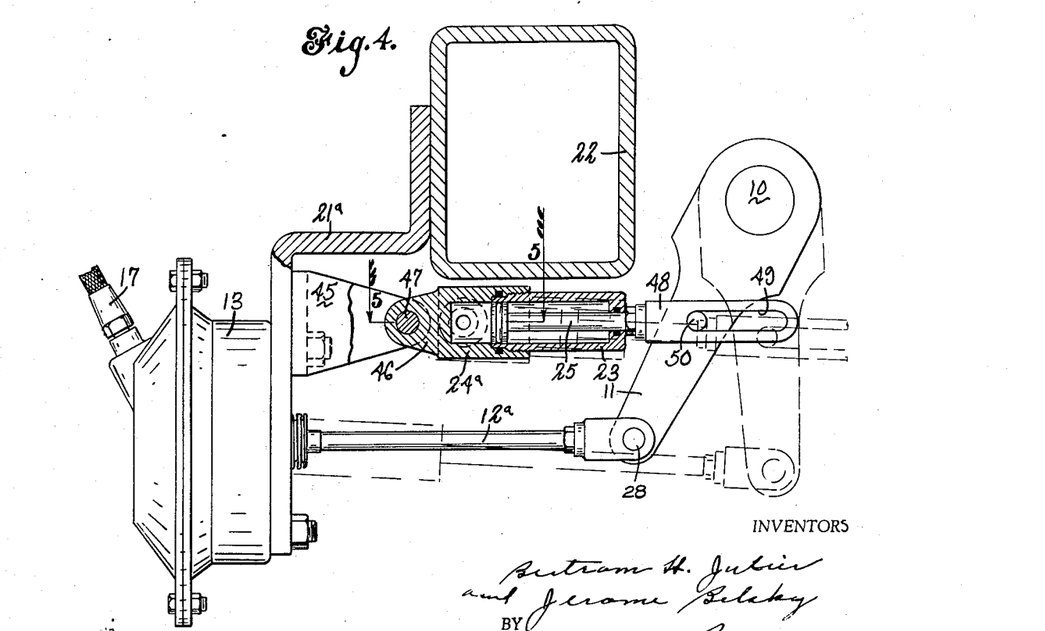
Fig. 4 is a view similar to Fig. 2 showing a modified form of our invention.

A modification of our invention is shown in Fig. 4 wherein the auxiliary unit is mounted in parallel with the piston rod 12ª which corresponds to the rod 12 previously described and which in this instance is directly connected to the arm 11 at the pivot 28. It is understood that the piston rod 12ª is actuated by the diaphragm in the chamber 13 as previously described. Likewise, the chamber 13 is supported from the axle 22 by the bracket 21ª.

A clevis-like bracket 45 may be secured to the bracket 21ª, and pivoted to this bracket 45 by the pivot pin 47 is the head 24ª of the cylinder 23. It is understood that the parts 23 and 24ª are the same as those previously described in connection with Figs. 1 to 3 of the drawing except that the cylinder head is provided with a lug 46 through which passes the pivot pin 47.

Figure 5:
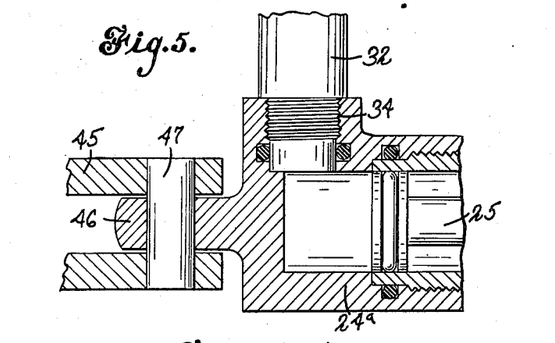
Fig. 5 is a sectional view on line 5—5 of Fig. 4.

The piston rod 25, in this form of the invention, carries an end plate 48 provided with an elongated slot 49 which receives a pin 50 on the arm 11. As shown in Figs. 4 and 5 a gas generator mechanism in the form of a cartridge within the casing 32 is secured to the cylinder head 24ª as previously described. This gas-generating cartridge may be the same as that shown in Fig. 3.

With the structure shown in Figs. 4 and 5, it will be understood that when the brake is operated in the usual way through the rod 12ª, the pin 50 slides freely within the slot 49 of the plate 48. However, if the ordinary brake-actuating mechanism fails and the cartridge within the casing 32 is ignited, the piston 25 will be driven to the right, as shown in Fig. 4, and by engagement of the plate 48 with the pin 50 will move the arm 11 from its full-line to its dotted-line position, thus setting the brake.

Figure 6:
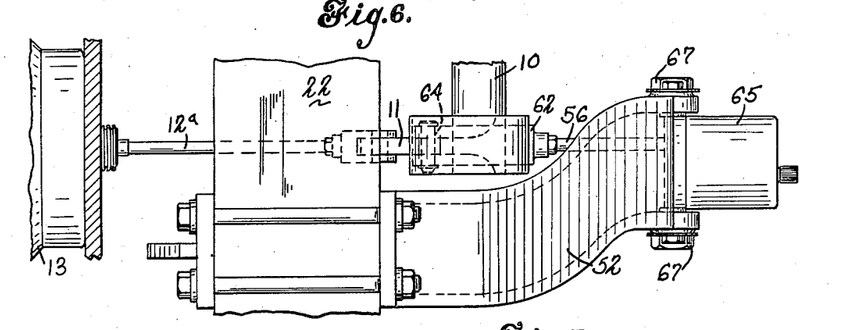
Fig. 6 is a top plan view of a further modification of our invention showing the auxiliary unit so located as to apply a "pull" to the brake-actuating arm.
Figure 7:
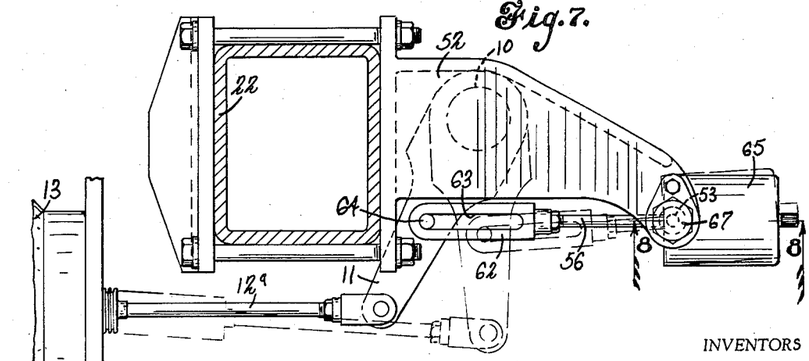
Fig. 7 is a side elevational view of the parts shown in Fig. 6.
Figure 8:
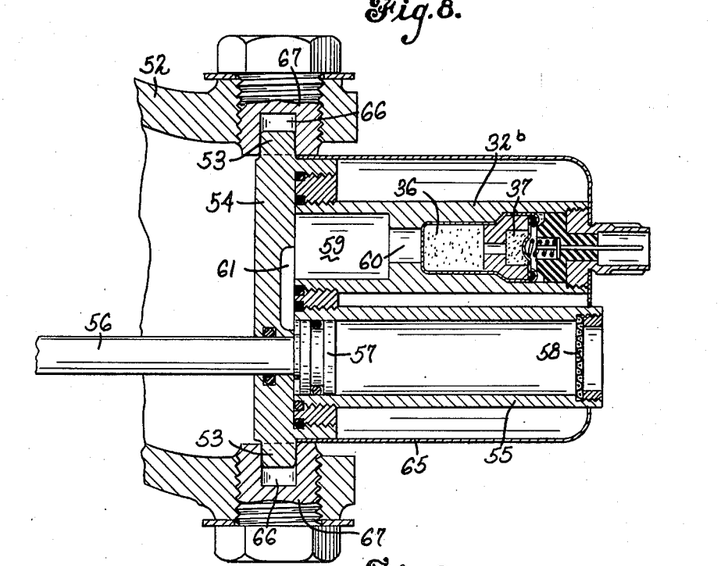
Fig. 8 is a sectional view on line 8—8 of Fig. 7.

A further modification of the invention is shown in Figs. 6 to 8 wherein the piston rod of the auxiliary piston and cylinder mechanism exerts a pull upon the brake-actuating arm or operates under tension instead of under compression, as shown in Fig. 4.

Referring to Fig. 7, the brake-operating arm 11 is shown in full lines with the brake released and the arm is normally moved to the position shown in dotted lines in this figure by the piston rod 12ª. As shown in these figures, a bracket 52 of U shape in cross section is secured to the vehicle axle 22, the rear end of this bracket being offset from the front end, as shown in Fig. 6. Pivotally mounted in the rear end of the bracket upon trunnions 53 is a supporting plate 54 (Fig. 8), which plate carries a cylinder 55 and a piston rod 56 having a piston 57 thereon. The cylinder may be covered at one end by a screen 58 which normally keeps dust and other extraneous materials from the cylinder but will allow air to pass therethrough.

Secured to the plate 54 adjacent the cylinder 55 is a gas-generating mechanism which includes a casing 32ᵇ, this casing containing a gas-generating cartridge with ignition mechanism like that shown in Fig. 3, the primer being shown at 37 and the propellent charge being shown at 36.

The casing 32ᵇ is provided with a chamber 59 into which the gases pass through the passage 60 after the charge has been exploded. The chamber 59 communicates by way of a passage 61 in the plate 54 with the forward end of the cylinder 55. As shown in Fig. 7, the piston 56 carries a plate 62 having an elongated slot 63 receiving a pin or stud 64 upon the arm 11. If desired, a casing 65 may be secured to the plate 54 to enclose the cylinder 55 and the casing 32ᵇ of the gas-generating mechanism.

In the operation of this device when the brake is operated in the usual way, the pin 64 slides freely within the slot 63 of the plate 62, the plate 54 being permitted to pivot about the trunnions 53 if necessary during this movement. When, however, the usual brake-operating mechanism fails, the operator of the vehicle, by closing an electric switch, ignites the charge 36, thus forcing the piston 57 to the right, as shown in Figs. 7 and 8. This exerts a pull upon the pin 64 and draws the actuating arm 11 from the full-line position to the dotted-line position shown in Fig. 7 to set the brake. It will be understood that during this movement the plate 54 and structure attached thereto may pivot about the trunnions 53 so as to permit arcuate movement of the pin or lug 64.

Sockets for the trunnions 53 may readily be provided by recesses 66 formed in screws 67 threaded into the opposite arms of the U-shaped bracket 52.

Figure 9:
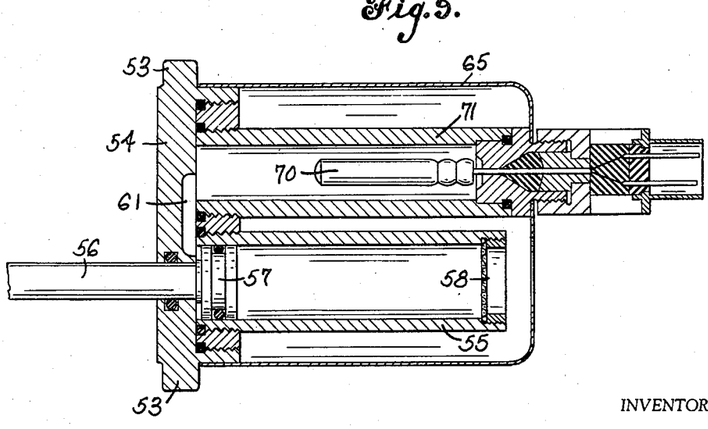
Fig. 9 is a view similar to Fig. 8 showing the use of a squib gas generator in place of the cartridges shown in Fig. 8.

Fig. 9 shows an auxiliary unit comprising a gas-generating mechanism and a piston and cylinder mechanism similar to that shown in Fig. 8. In this instance, however, the gas generator is in the form of a squib 70 mounted in a casing 71 secured to the plate 54, the casing being in communication with the passage 61 in the latter plate. Except for the fact that a squib gas generator is employed instead of a cartridge, the unit shown in Fig. 9 is like that shown in Fig. 8.

Figure 10:
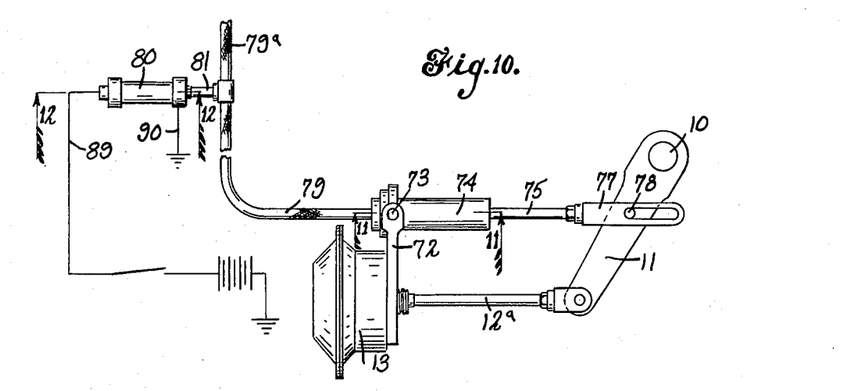
Fig. 10 is a side elevational view of a further modification showing the initiator or gas generator at a point remote from the auxiliary piston and cylinder unit.
Figure 11:
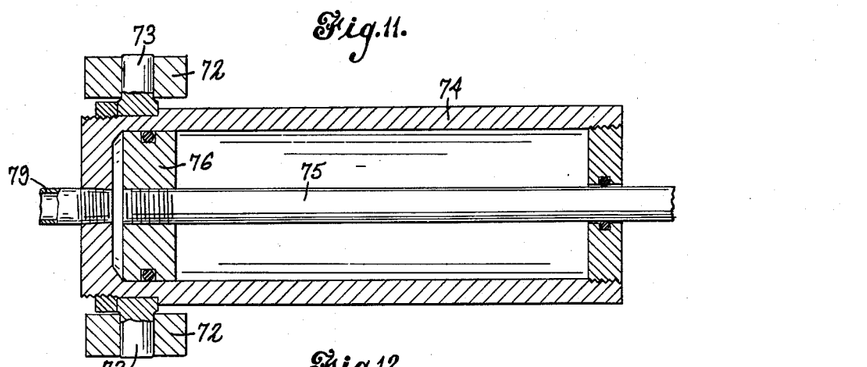
Fig. 11 is a sectional view on line 11—11 of Fig. 10.
Figure 12:
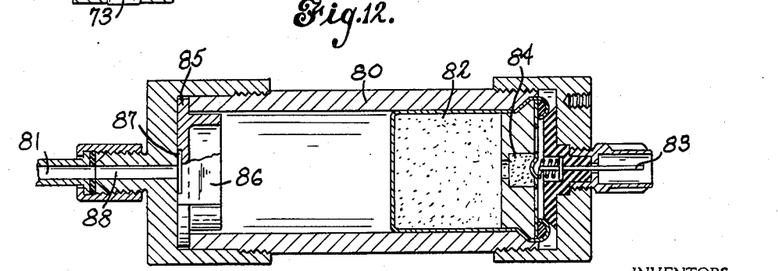
Fig. 12 is a sectional view through the initiator or gas generator on line 12—12 of Fig. 10.

In Figs. 10 to 12 of the drawing, there is shown a further modification of the invention which is similar in some respects to that shown in Figs. 4 and 5. In this instance, however, the gas-generating mechanism is mounted at a point remote from the auxiliary actuating unit. As shown in Fig. 10, the brake is set by the arm 11 normally actuated by the rod 12ª from a diaphragm (not shown) in the chamber 13. Pivotally carried upon arms 72 secured to this chamber by trunnions 73 rotatably received within openings in the arms is the auxiliary operating unit comprising the cylinder 74 within which is the piston 75 and piston head 76 as before. As shown in Fig. 10, the piston 76 carries the slotted plate 77 engaging a pin 78 upon the arm 11.

Leading into the forward end of the cylinder 74 is a flexible fluid pressure line 79 which leads to a gas-generating unit 80 situated at a remote point. The gas generated by this unit flows into the conduit 79 through the tube 81, and a second conduit 79ª may lead to the brake of the wheel on the other side of the vehicle.

The gas-generating unit is shown more particularly in Fig. 12 wherein a cartridge 82 is housed in the outer casing 80 and is ignited by an electric current introduced through the lead 83 which ignites the priming mixture 84. The gas thus generated passes out of the casing around a filter 85 which is inserted in the casing 80 to prevent the entrance of extraneous matter. This member 85 is provided with a flat side 86 so that the interior of the casing 80 can communicate with the recess 87 from which leads the passage 88 into the tube 81 and thence to the cylinder 74. It is believed that the operation of this form of our device will be clear from the explanation previously given. It may be stated that the lead 83 is connected to a source of current through the conductor 89, and the casing 80 is grounded upon the vehicle, as shown at 90.

Instead of employing an electrically ignited primer in the cartridge, a primer may be employed which will be activated by a percussive force. Such an arrangement is shown in Fig. 13, and it will be understood that the gas generator shown in this figure may be substituted for those previously described.

As shown in this figure, the gas generator comprises an outer casing 91 within which is mounted the gas-generating cartridge 92 having the charge 93 and the primer 94. The primer is activated when struck by the firing pin 95 of a plunger 96 slidably mounted in an inner casing 97 which is in turn mounted within an outer casing 97ª secured to the casing 91.

Figure 13:
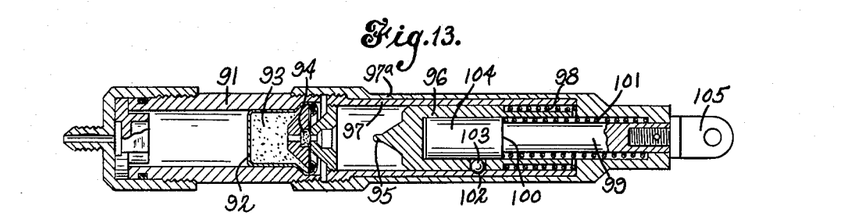
Fig. 13 is a sectional view of a gas generator or an initiator actuated by a lanyard or percussion means instead of electrically.

The plunger 96 is hollow and is reduced in size externally adjacent one end so that a spring 98 may be introduced between this plunger and the casing 97, this spring urging the plunger toward the left, as shown in Fig. 13. Mounted within the plunger is a lanyard 99 which is provided with a shouldered portion 100 against which acts a spring 101 to normally move the lanyard toward the left. The casing 97 is provided with shallow recesses 102 within which retaining members or balls 103 are normally retained by the enlarged end 104 of the lanyard 101.

With the parts in the position shown in Fig. 13, the device may be considered as "cocked" in that the portion 104 of the lanyard retains the ball detents 103 in the recesses 102 in the inner casing 97 and prevents movement of the firing pin plunger 96 to the left by the spring 98. However, when the lanyard 99 is pulled to the right as by a cord (not shown) attached to the lug 105 secured to the lanyard, the enlarged end 104 of the latter is moved to the right beyond the detents 103, and the latter are permitted to move inwardly out of the recesses 102. The spring 98 then forces the plunger 96 to the left allowing the firing pin to strike the primer 94 and detonate the primer. The charge is then transmitted to the auxiliary actuating piston and cylinder unit shown in any of the modifications of our invention previously described.

Figures 14, 15:
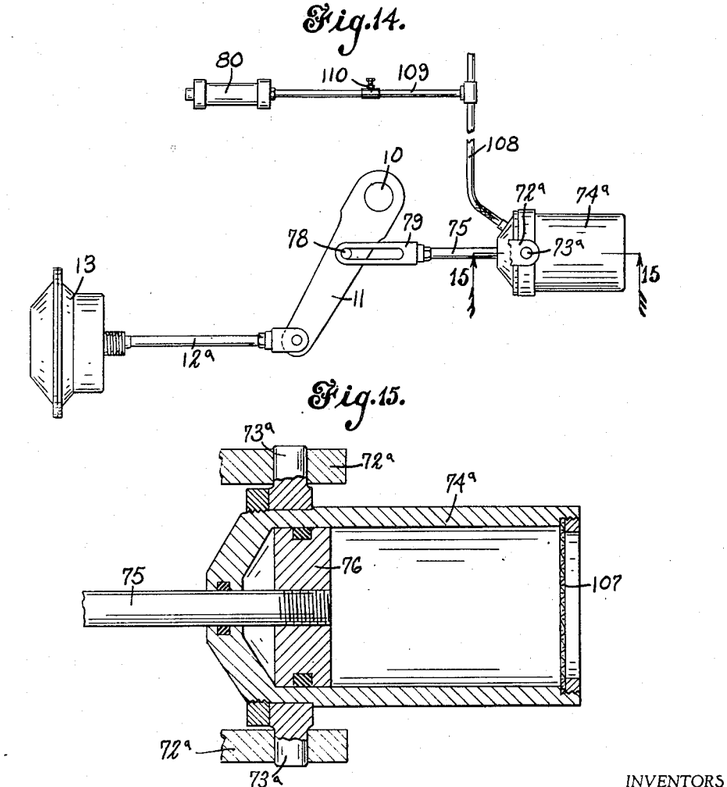
Fig. 14 is a further modification similar to that shown in Fig. 10 but showing a "pull" type actuation of the brake-applying arm.
Fig. 15 is a sectional view on line 15—15 of Fig. 14.

In Figs. 14 and 15 of the drawing there is shown a further modification of the invention which is similar to that shown in Figs 10 to 12 except that the auxiliary actuating unit operates through a pull instead of through a push or thrust as shown in the previous figures. In this instance the piston 75 is connected to the pin 78 by the slotted plate 79 as before and the cylinder 74ª is mounted by trunnions 73ª in the arms 72ª of a bracket suitably mounted on the vehicle. The rear end of the cylinder may be closed by a screen 107 while pressure fluid is introduced into the front end of the cylinder through the tubular member 108 which communicates with the member 109 which in turn leads to the gas-generating unit 80. As this mechanism operates similarly to that previously described in connection with Figs. 10 to 12 except that it is a pull type actuator, further description thereof is unnecessary.

In this modification of the invention as well as in that shown in Figs. 10 to 12, a metering valve 110 may be placed in the line between the gas-generating unit 80 and the auxiliary actuating unit 74 or 74ª to regulate the supply of pressure gas to the latter unit in order to control the speed of operation of the actuating cam shaft 10.

In the modifications of our invention previously described in Figs. 4 to 15, the piston of the actuating unit has been connected to the usual arm 11 provided upon the brake-actuating cam shaft 10. It will be understood, however, that if desired a second arm may be provided upon the shaft 10 and the piston rod of the auxiliary actuating unit connected to this second arm if such arrangement is desired. It will be understood that in such case a lost motion connection will be provided between the piston and this second arm just as is provided between the piston and the arm 11 by the slotted member 48, 77 or 79.

It will also be understood that the vehicle brakes when actuated by the emergency unit will be held in their braking positions until the gas generated by the cartridge is released in some manner from the cylinder. This may be done, for example, by removal of the case which holds the gas-generating cartridge in order that a new cartridge may be placed therein or the pressure in the cylinder of the auxiliary unit may be released by other means.

Figure 16:
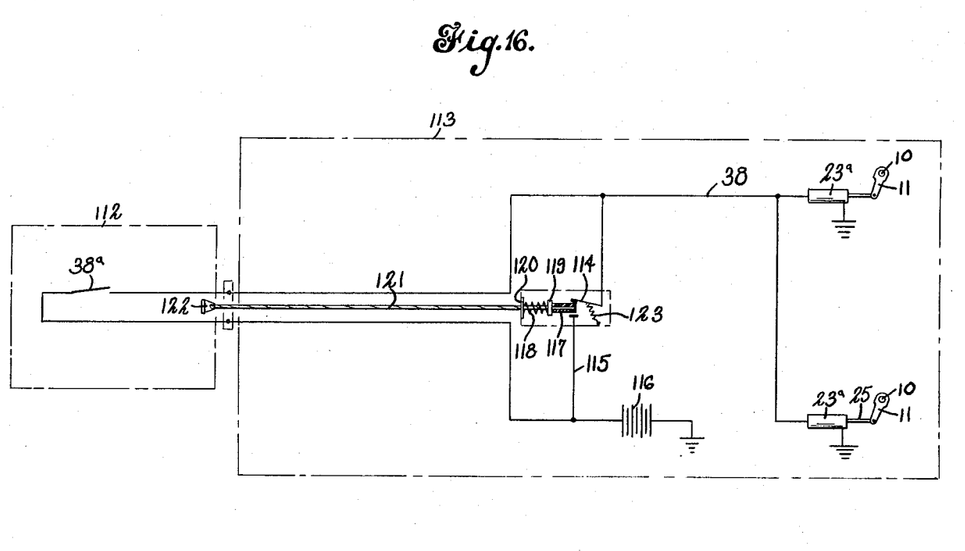
Fig. 16 is a diagrammatic view showing means for automatically actuating the auxiliary brake-applying means.

It will sometimes be found desirable to provide for automatic actuation of the auxiliary brake-operating means, and this is particularly true in the event that the invention is applied to a truck and trailer combination so that the brakes will be automatically applied to the trailer if it becomes disconnected from the truck. Such an arrangement is shown in Fig. 16 of the drawings.

In this figure the truck is shown diagrammatically at 112 and the trailer at 113. Upon the trailer is mounted the usual brake-cam-actuating shaft 10 and actuating arm 11 secured thereto. The arm 11 is actuated by the plunger 25 of the auxiliary actuating means 23ª which may be of the form shown in Figs. 1, 2 and 3. The electrical conductor 38 which serves to ignite the primer of the gas-generating cartridge leads to the switch 38ª located upon the tractor at a point convenient to the operator and also leads to a switch 114 which may be located upon the trailer. The other contact of the switch 114 is connected by the wire 115 to a battery or other source of current 116.

The contacts of the switch 114 are normally held open by a plunger 117 of insulating material which is urged to its operative position by a spring 118 which acts between a washer 119 on the plunger and an abutment 120 on the trailer.

Secured to the plunger 117 is a cable or lanyard 121 which is detachably secured at 122 at a point on the tractor.

So long as the parts are in the position shown in Fig. 16, the contacts of the switch 114 will be held apart by the plunger 117 and no current will flow through the connector 38. However, if the tractor should become disconnected from the trailer, the pull upon the lanyard 121 would draw the plunger 117 to the left, as shown in Fig. 16, thus permitting the contacts of the switch 114 to be closed under the influence of the spring 123. This would connect the line 38 with the battery or other source of current 116 and ignite the primer of the auxiliary brake-actuating means 23ª to move the plungers 25 to the right and set the brakes on the trailer. It will be understood that the brakes may also be applied by the operator by closing the switch 38ª which is in parallel with the switch 114.

While we have shown and described some preferred embodiments of our invention, it will be understood that it is not to be limited to all of the details shown, but is capable of modification and variation within the spirit of the invention and within the scope of the claims.

What we claim is:

1. Main and auxiliary brake-applying means for a vehicle comprising an oscillatable brake-applying arm, a chamber, a diaphragm spanning the chamber, said chamber having a pressure-fluid inlet opening at one side of said diaphragm, means connecting said arm to said diaphragm for operation thereby and independently thereof, said means comprising a piston rod seated against the other side of said diaphragm and extending without the chamber, a cylinder secured to the extended end of said rod, a second piston within said cylinder and extending therefrom and connected to said arm, and a cartridge of gas-generating combustible material carried by said cylinder and in communication therewith behind said second piston to introduce gas pressure into the cylinder to move said second piston and said brake-applying arm, and means for firing said cartridge.

2. Main and auxiliary brake-applying means for a vehicle comprising an oscillatable brake-applying arm, a chamber, a diaphragm spanning the chamber, said chamber having a pressure-fluid inlet opening at one side of said diaphragm, means connecting said arm to said diaphragm for operation thereby and independently thereof, said means comprising a piston rod seated against the other side of said diaphragm and extending without the chamber, a cylinder and piston operating therein, one of which is secured to said rod and the other secured to said arm, and a cartridge of gas-generating combustible material carried by said cylinder and in communication with the interior thereof behind said piston to introduce gas pressure into the cylinder to move said brake-applying arm, and means for firing said cartridge.

3. A brake-applying means as in claim 2 wherein electrical means is provided for firing the cartridge.

4. Emergency brake-applying means as in claim 1 wherein priming means is provided for said cartridge and percussion means is provided to activate said priming means.

5. Emergency brake-applying means for a vehicle as in claim 1 wherein the vehicle comprises a tractor and a trailer, and the means for effecting combustion of said material is automatically actuated by separation of the tractor from the trailer.

6. Emergency brake-applying means for a vehicle as in claim 1 wherein the vehicle comprises a tractor and a trailer, and the combustion of the combustible material of the cartridge is effected electrically in response to the separation of the tractor from the trailer.

7. Emergency brake-applying means for a vehicle as in claim 1 wherein the electrically operated means for igniting the combustible charge is manually and automatically actuated.

References Cited in the file of this patent

UNITED STATES PATENTS

| 1,444,984 | Simmon | Feb. 13, 1923 |
| 1,782,571 | Hukill | Nov. 25, 1930 |
| 1,925,864 | Delay | Sept. 5, 1933 |
| 2,645,313 | Schaadt | July 14, 1953 |
| 2,649,169 | Holman | Aug. 18, 1953 |
| 2,674,852 | Olman | Apr. 13, 1954 |
| 2,726,738 | Fawick | Dec. 13, 1955 |
| 2,815,101 | Freiss | Dec. 3, 1957 |
| 2,871,827 | Euga | Feb. 3, 1959 |

FOREIGN PATENTS

| 548,727 | Great Britain | Oct. 22, 1942 |